United States Patent [19]
Ohori et al.

[11] Patent Number: 6,156,662
[45] Date of Patent: Dec. 5, 2000

[54] FABRICATION PROCESS OF A LIQUID CRYSTAL DISPLAY DEVICE WITH IMPROVED YIELD

[75] Inventors: Tatsuya Ohori; Tamotsu Wada; Kohji Ohgata; Tatsuya Kakehi; Ken-ichi Yanai, all of Kawasai, Japan

[73] Assignee: Fujitsu Limited, Kawasaki, Japan

[21] Appl. No.: 09/281,128

[22] Filed: Mar. 29, 1999

[30]     Foreign Application Priority Data

Jul. 7, 1998  [JP]  Japan ................................ 10-192012

[51] Int. Cl.$^7$ .................................................. H01L 21/311
[52] U.S. Cl. ........................ 438/694; 438/696; 438/745; 438/751
[58] Field of Search ..................... 438/689, 694, 438/696, 745, 749, 751, 754, 164, 165, 635

[56]          References Cited

U.S. PATENT DOCUMENTS 5,397,719   3/1995   Kin et al. ................................ 437/40
5,508,209   4/1996   Zhang et al. ............................ 437/21
5,861,326   1/1999   Yamazaki et al. ..................... 438/149
5,885,888   3/1999   Konuma et al. ........................ 438/585
6,049,092   4/2000   Konuma et al. ........................ 257/66

FOREIGN PATENT DOCUMENTS 52-138887   11/1977   Japan.
54-23375    2/1979    Japan.
63-90832    4/1988    Japan.

*Primary Examiner*—Benjamin L. Utech
*Assistant Examiner*—Kin-Chan Chen
*Attorney, Agent, or Firm*—Greer, Burns & Crain, Ltd.

[57]          ABSTRACT

A method of fabricating a liquid crystal display device includes the step of removing a porous anodic oxide film selectively with respect to a barrier-type anodic oxide film covering a gate electrode pattern of a thin-film transistor, wherein the step of removing the porous anodic oxide film is conducted after the step of disconnecting a bridging conductor pattern used for supplying electric current at the time of anodic oxidation process of the gate electrode.

12 Claims, 18 Drawing Sheets

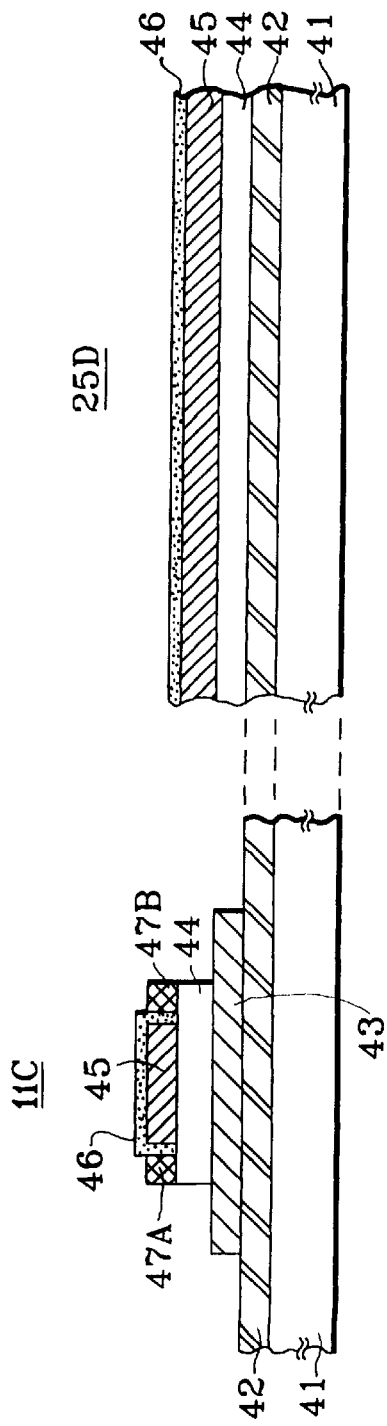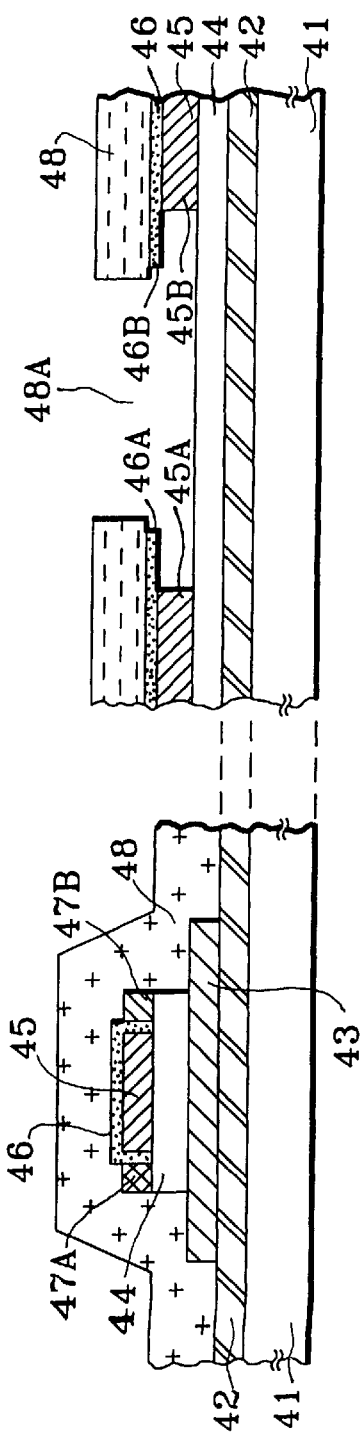

Cr-MIXED-ACID

1/9

1/18

1/25

Aℓ-MIXED-ACID

POROUS AO REMOVAL: Cr-MIXED ACID 45°
6 min 30 sec.

INTERLAYER INSULATION FILM
SiO$_2$
BARRIER A
GATE A$l$
GATE SiO$_2$
P-Si

FABRICATION PROCESS OF A LIQUID CRYSTAL DISPLAY DEVICE WITH IMPROVED YIELD

BACKGROUND OF THE INVENTION

The present invention generally relates to liquid crystal display devices and more particularly to fabrication of a liquid crystal display device having a gate electrode pattern of Al or an Al alloy.

Liquid crystal display devices are used extensively in information processing apparatuses such as a computer as a compact display device consuming little electric power.

In order to realize a high-quality color representation, recent liquid crystal display devices tend to use a so-called active-matrix driving method, in which each of the pixel electrodes in the liquid crystal display device is turned on and off by a corresponding TFT that is provided on a glass substrate constituting the liquid crystal display device in correspondence to the pixel electrode.

Conventionally, the TFTs for use in liquid crystal display devices have used a gate electrode of Cr in view of the reliability and high yield of production. On the other hand, recent liquid crystal display devices having a large display area require a low resistance material such as Al for the gate electrode. On the other-hand, such a gate electrode formed of Al or an Al alloy suffers from the problem of hillock, in which crystal grains constituting the polycrystalline Al gate cause a migration in the gate electrode so as to relax the stress when a thermal annealing process is applied in the fabrication process of the TFT. Such a hillock causes a formation of projections in the Al gate electrode.

FIG. 1 shows the construction of a conventional active-matrix type liquid crystal display device 10.

Referring to FIG. 1, the liquid crystal display device 10 includes a TFT glass substrate 11 carrying thereon a number of TFTs and corresponding transparent pixel electrodes, and a glass substrate 12 is provided on the TFT substrate 11 so as to face the TFT substrate 11 with a gap formed therebetween. The gap thus formed is filled by a liquid crystal layer 1 in the state that the liquid crystal layer 1 is confined between the TFT substrate 11 and the opposing substrate 12 by a seal member not illustrated.

In the conventional liquid crystal display device 10 of the foregoing construction, the direction of the liquid crystal molecules in the liquid crystal layer 1 is selectively modified by applying a drive voltage to a selected pixel electrode via a corresponding TFT.

Further, it should be noted that the liquid crystal display device 10 includes a pair of polarizers at respective outer sides of the glass substrates 11 and 12 in the crossed Nicol state, and the glass substrates 11 and 12 further carry molecular alignment films on the respective interior sides thereof in contact with the liquid crystal layer 1.

FIG. 2 shows a part of the TFT substrate 11 in an enlarged scale.

Referring to FIG. 2, the TFT substrate 11 carries thereon a number of pad electrodes 11A for receiving a scanning signal and a number of scanning electrodes 11a each extending from a corresponding pad electrode 11A in a first direction. Further, the TFT substrate 11 carries thereon a number of pad electrodes 11B for receiving an image signal and a number of signal electrodes 11b each extending from a corresponding pad electrode 11B in a second direction generally perpendicular to the first direction. Further, in correspondence to each intersection of a scanning electrode 11a and a signal electrode 11b, there is provided a TFT 11C and a corresponding transparent pixel electrode 11D.

In the liquid crystal display device 10 of the foregoing construction, one of the scanning electrodes 11a is selected by selectively supplying a scanning signal to the corresponding electrode pad 11A. Further, a signal electrode 11b is selected by supplying an image signal to the corresponding electrode pad 11B. Thereby, the image signal is forwarded to the corresponding transparent pixel electrode 11D via the TFT 11C.

FIG. 3 shows the construction of a conventional TFT 11C.

Referring to FIG. 3, the TFT 11C is constructed on a glass substrate 21 corresponding to the TFT substrate 11 of FIG. 1 and includes an $SiO_2$ film 22 formed on the glass substrate 21 with a thickness of about 200 nm, an active region 23 of a B-doped polysilicon pattern formed on the $SiO_2$ film 22 with a thickness of about 45 nm, an $SiO_2$ gate insulation film 24 formed on the active region 23 with a thickness of about 120 nm, and a gate electrode 25 of Al or an Al alloy such as an Al—Sc alloy or an Al—Nd alloy formed on the gate insulation film 24 with a thickness of about 300 nm. The gate electrode 25 is covered by a dense, anode-oxidized $Al_2O_3$ film with a thickness of about 10 nm.

The gate electrode 25 and the anode-oxidized $Al_2O_3$ film 26 cover a part of the gate insulation film 24, while the active region 23 is formed with diffusion regions 23A and 23B of the $n^+$-type at the outer sides of the gate insulation film 24. Further, the active region 23 includes an offset region 23C of the $n^-$-type characterizing an LDD structure adjacent to the $n^+$-type diffusion region 23A in overlapping relationship with the gate insulation film 24 when viewed perpendicularly to the substrate 21. Similarly, an offset region 23D of the $n^-$-type is formed in the active region 23 adjacent to the $n^+$-type diffusion region 23B in overlapping relationship with the gate insulation film 24.

In the TFT of FIG. 3, it should be noted that a scanning electrode 11a of FIG. 2 is connected to the gate electrode 25, while one of the $n^+$-type diffusion regions 23A and 23B is connected to a signal electrode 11b. Thereby, the other of the diffusion regions 23A and 23B is connected to a transparent pixel electrode 11D via a contact hole formed in a protective insulation film not illustrated.

FIGS. 4A–4F show the fabrication process of the TFT of FIG. 3.

Referring to FIG. 4A, an amorphous silicon film doped with B is formed on the $SiO_2$ film 22 covering the glass substrate by a plasma CVD process, followed by a crystallization process conducted by irradiating an excimer laser beam to convert the amorphous silicon film to a polysilicon film. The excimer laser beam induces a heating in the amorphous silicon film to a temperature of about 200° C. The foregoing active region 23 is then formed by a patterning process of the polysilicon film thus formed, wherein the patterning process may be conducted by an RIE process using $CF_4$ and $O_2$.

Next, an $SiO_2$ film 24A is deposited on the $SiO_2$ film 22 in correspondence to the gate oxide film 24 by a plasma CVD process using TEOS, such that the $SiO_2$ film 24A covers the polysilicon active region 23. Further, a conductor layer 25A of Al or an Al alloy is formed on the $SiO_2$ film 24A in correspondence to the gate electrode 25 by a sputtering process, and a dense anodic oxide film 28A is formed on the surface of the conductor layer 25A with a thickness of typically about 10 nm. The anodic oxide film 28A may be formed by conducting an anodic oxidation process of the conductor layer 25A in a solution of ammonium tartrate and ethylene glycol while applying a constant voltage. The anodic oxide film 28A thus formed has a dense structure and is generally called "barrier-type" or "barrier AO." It should be noted that the anodic oxide film 28A shows an etching rate generally equal to the etching rate of Al against an etchant called "Al-mixed-acid," which is used commonly for the etching of Al, wherein the Al-mixed-acid is primarily formed of a phosphoric acid ($H_3PO_4$) added further with an acetic acid and a nitric acid.

Next, in the step of FIG. 4B, a resist pattern 29 is formed on the anodic oxide film 28A, followed by a patterning of the anodic oxide film 28A and the conductor layer 25A underneath the film 28A while using the resist pattern 29 as a mask, to form a conductor pattern 25B carrying thereon an anodic oxide pattern 28B. In this patterning process, the conductor layer 25A is patterned by a wet etching process at a temperature of typically 45° C. while using the foregoing Al-mixed-acid as an etchant.

Next, in the step of FIG. 4C, the part of the anodic oxide pattern 28B forming an overhang structure under the resist pattern 29 is removed by a wet etching process, and a pair of porous anodic oxide films 27A and 27B are formed at both lateral sides of the conductor pattern 25B by an anodic oxidation process conducted in an oxalic acid while supplying a substantially constant current to the conductor pattern 25B. As a result of the formation of the anodic oxide film 27A and 27B, there is formed a conductor pattern 25C in the conductor pattern 25B such that the conductor pattern 25C is laterally surrounded by the foregoing porous anodic oxide films 27A and 27B. It should be noted that the conductor pattern 25C is a remaining part of the original conductor layer 25.

It should be noted that the foregoing porous anodic oxide films 27A and 27B are generally called "porous-type" or "porous AO," wherein the porous AO has a feature of being dissolved by the foregoing Al-mixed-acid. On the other hand, the etching of the overhang part of the anodic oxide pattern 28B is conducted by a Cr-mixed-acid to be described later at a temperature of about 65°.

Next, in the step of FIG. 4D, the resist pattern 29 of FIG. 4C is removed and the $SiO_2$ film 24A is subjected to a dry etching process while using the anodic oxide films 27A and 27B and the intervening Al pattern 25C to form the gate insulation film 24 of FIG. 3. Next, the structure thus obtained is subjected to an anodic oxidation process substantially identical with the anodic oxidation process used for forming the anodic oxide film 28A, to form a dense barrier-type anodic oxide film similar to the anodic oxide film 28A in the region 25C, wherein the dense barrier-type anodic oxide film thus formed constitutes the anodic oxide film 26 of FIG. 3. It should be noted that the anodic oxide film 26 thus formed covers the top part and both lateral sides of the gate electrode 25.

Next, in the step of FIG. 4E, the porous anodic oxide films 27A and 27B are removed by a wet etching process using the Al-mixed-acid, typically at a temperature of 45° C. As a result of the wet etching process, a surface part of the gate insulation film 24 is exposed at the outer sides of the barrier-type anodic oxide film 26.

Next, in the step of FIG. 4F, an ion implantation process of P or As is conducted into the active region 23 while using the gate electrode 25 and the anodic oxide film 26 as a mask. By conducting a thermal annealing process, the $n^+$-type diffusion regions 23A and 23B are formed in the active region 23 at the outer sides of the gate insulation film 24. Further, the ion implantation process of the impurity element occurs also in the regions 23C and 23D via the gate oxide film 24, and the regions 23C and 23D form the LDD region of the $n^-$-type.

In the steps of FIGS. 4A–4F, the gate electrode 25 is covered by the barrier-type, dense anodic oxide film 26 and the hillock formation in the gate electrode 25 is effectively suppressed even when a thermal annealing process is conducted for activating the diffusion regions 23A and 23B or the LDD regions 23C and 23D.

In the anodic oxidation process of FIG. 4C or FIG. 4D, it should be noted that the conductor patterns 25B on the substrate 21 corresponding to the glass substrate 11 of FIG. 2 are connected with each other by a conductor pattern 25D for supplying an electric current to the conductor pattern 25B or 25C. Thereby, the conductor pattern 25D forms, together with the conductor patterns 25B or 25C, a lattice pattern on the substrate 21. The conductor pattern 25D is formed in the step of FIG. 4B simultaneously and integrally with the conductor pattern 25B, wherein the conductor pattern 25D thus formed is removed after the step of FIG. 4E by a wet etching process conducted while using a resist mask 31. As a result of the wet etching process of the conductor pattern 25D, the gate electrode patterns 25 are separated from each other.

It should be noted that the wet etching process of the conductor pattern 25D is conducted by using the resist mask 31 as represented in FIG. 5, wherein the resist mask 31 includes a window 31A exposing the conductor pattern 25D. While not illustrated in FIG. 5, it should be noted that the conductor patterns 25B and the conductor pattern 25D carry thereon the anodic oxide film 28B represented in FIG. 4B.

FIG. 6 shows the foregoing wet etching process of the conductor pattern 25D conducted by using the resist mask 31.

Referring to FIG. 6, it will be noted that the conductor pattern 25D is divided into a first Al pattern $(25D)_1$ and a second Al pattern $(25D)_2$ as a result of the wet etching process. Further, the anodic oxide film 28B on the conductor pattern 25D is also divided into a first oxide pattern $(28B)_1$ and a second oxide pattern $(28B)_2$, wherein the patterning of the dense anodic oxide film 28B is conducted by a Cr-mixed-acid, which is a phosphoric acid etchant having a composition similar to that of the Al-mixed-acid but added further with $CrO_3$. The wet etching process using the Cr-mixed-acid is conducted typically at about 65°. On the other hand, the conductor pattern 25D underneath the anodic oxide pattern 28 is conducted by using the Al-mixed-acid typically at a temperature of 45° C.

In the fabrication process of recent liquid crystal display devices having a large display area, it is necessary to increase the duration of the etching process for eliminating the etching residue completely. In such a case, the Al conductor pattern 25D experiences a substantial lateral etching and the conductor patterns $(25D)_1$ and $(25D)_2$ tend to be receded with respect to the anodic oxide films $(28B)_1$ and $(28B)_2$. In other words, the anodic oxide films $(28B)_1$ and $(28B)_2$ form an overhang of 1–2 $\mu$m with respect to the conductor patterns $(25D)_1$ and $(25D)_2$. As a result of the process of FIG. 6, a gate electrode 25 of FIG. 4E is electrically separated from other gate electrodes 25.

FIG. 7 shows the case of applying the etching process of FIG. 6 to the conductor pattern 25B formed on a glass substrate of a large area.

Referring to FIG. 7, it was discovered that, as a result of the etching process of FIG. 6, the width of the gate electrode 25 is reduced significantly in correspondence to the part where the conductor pattern 25D has been formed. When such an abnormal narrowing of the conductor pattern is caused in the gate electrode 25, the yield of the liquid crystal display device is deteriorated inevitably. Associated with this, the reliability of the produced liquid crystal display device is also deteriorated. In FIG. 7, it should be noted that the illustration of the anodic oxide film 26 on the gate electrode pattern 26 is omitted for the sake of simplicity. As a result of the patterning of the conductor pattern 25D, the conductor patterns 25B of FIG. 5 are changed to the gate electrodes 25 in the state of FIG. 7.

FIGS. 8A and 8B show a possible mechanism of the foregoing anomaly caused in the gate electrode 25, wherein those parts corresponding to the parts described previously are designated by the same reference numerals and the description thereof will be omitted.

Referring to FIG. 8A, it can be seen that the lateral edge part of the Al pattern $(25D)_1$ or the Al pattern $(25D)_2$ is receded, as a result of the wet etching process of the conductor pattern 25D, with respect to a corresponding lateral edge of resist pattern 31 defining the resist window 31A. As a result, there is formed an overhang structure in the barrier-type anodic oxide film $(28B)_1$ as noted before.

When the resist pattern 31 is removed in this state by using an exfoliating liquid, the anodic oxide film $(28B)_1$ or $(28B)_2$, now losing a mechanical support, may become slackened and bend on the $SiO_2$ film 22 as indicated in FIG. 8B. When this occurs, the slackened anodic oxide film $(28B)_1$ of $(28B)_2$ may wrap the exfoliating liquid in the space formed between the $SiO_2$ film, the lateral edge of the Al pattern $(25D)_1$ and the slackened anodic oxide film $(28B)_1$.

While the exfoliating liquid itself does not cause an etching in the Al pattern $(25D)_1$, it seems that the exfoliating liquid does cause, when mixed with water, an etching on the side wall of the Al pattern $(25D)_1$ or $(25D)_2$ with a substantial etching rate.

FIG. 9 shows another problem pertinent to the conventional fabrication process of the liquid crystal display device, wherein those parts corresponding to the parts described previously are designated by the same reference numerals and the description thereof will be omitted.

In the conventional process of FIG. 4E, the porous anodic oxide films 27A and 27B of FIG. 4D are removed by a selective wet etching process conducted by using an Al-mixed-acid. It should be noted that the step of FIG. 4E is conducted before the separation step of FIG. 6. Thus, when there is a pinhole 26X in the barrier-type anodic oxide film 26 as represented in FIG. 9, the gate electrode 25 is also etched by the Al-mixed-acid, as the Al-mixed-acid reacts also on Al.

The problem of FIG. 9 is observed frequently when fabricating a large size liquid crystal display device, particularly when the foregoing wet etching process of the porous anodic oxide films 27A and 27B is conducted in the state that the gate electrodes 25 are connected with each other by the conductor pattern 25D. While the reason of this phenomenon is not fully explored, it seems that the formation of the pinhole 26X is related to an electrochemical reaction caused by a current flowing through the conductor pattern. When such an etching is caused in the gate electrode 25 in correspondence to the pinhole 26X, the yield of production of the liquid crystal display device is deteriorated seriously. Further, the liquid crystal display devices thus formed have a serious problem of reliability.

SUMMARY OF THE INVENTION

Accordingly, it is a general object of the present invention to provide a novel and useful fabrication process of a liquid crystal display device wherein the foregoing problems are eliminated.

Another and more specific object of the present invention is to provide a fabrication process of a liquid crystal display device having a TFT wherein the yield of production of the liquid crystal display device is improved substantially.

Another object of the present invention is to provide a fabrication process of a liquid crystal display device, said liquid crystal display device including: a first substrate; a second substrate facing said first substrate with a separation therefrom by a gap; a thin-film transistor formed on said first substrate; and a liquid crystal layer confined in said gap, said method comprising the steps of:

forming a semiconductor layer on said first substrate;

forming an insulation film on said semiconductor layer;

forming a metal layer on said insulation film;

anode-oxidizing a surface of said metal layer, to form a first anodic oxide film of a barrier-type on said surface;

patterning, after said step of forming said first anodic oxide film, said metal layer to form a conductor pattern defined by a pair of edges such that said conductor pattern includes a gate electrode pattern and a bridging pattern, said bridging pattern extending on said first substrate from said gate electrode pattern to another gate electrode pattern;

anode-oxidizing, after said step of patterning said metal layer, said conductor pattern to form a second, porous anodic oxide film on each of said edges of said conductor pattern;

anode-oxidizing, after said step of forming said second anodic oxide film, said conductor pattern to form a third, barrier-type anodic oxide film in each of said edges, such that said third anodic oxide film is located inside said second anodic oxide film;

removing, after said step of forming said third anodic oxide film, said bridging pattern by an etching process such that said gate electrode pattern is isolated from said another gate electrode pattern; and removing, after said step of removing said bridging pattern, said second anodic oxide film by an etching process.

Another object of the present invention is to provide a fabrication process of a liquid crystal display device, said liquid crystal display device including: a first substrate; a second substrate facing said first substrate with a separation therefrom by a gap; a conductor pattern formed on said first substrate; and a liquid crystal layer confined in said gap, said method comprising the steps of:

anode-oxidizing said conductor pattern to form an anodic oxide film of a barrier-type on said conductor pattern;

removing a part of said anodic oxide film by conducting a wet etching process;

removing said conductor pattern for a part from which said anodic oxide film is removed by conducting a wet etching process; and removing, after said step of removing said conductor pattern, said anodic oxide film by a wet etching process.

According to the present invention, the etching process of the second anodic oxide film is conducted after the bridging pattern is removed by etching. Thus, the problem of electrochemical reaction occurring in the barrier-type first or third anodic oxide film on the gate electrode is eliminated and the formation of pinholes in the foregoing barrier-type anodic oxide films is effectively suppressed.

Another object of the present invention is to provide a fabrication process of a liquid crystal display device including a first substrate, a second substrate facing said first substrate with a separation therefrom by a gap, a thin film transistor formed on said first substrate, and a liquid crystal layer confined in said gap, said method comprising the steps of:

forming a semiconductor layer on said first substrate;

forming an insulation film on said semiconductor layer;

forming a metal layer on said insulation film;

anode-oxidizing a surface of said metal layer to form a first, barrier-type anode oxide film on said surface;

patterning, after said step of forming said first anodic oxide film, said metal layer to form a conductor pattern defined by a pair of edges and including a gate electrode pattern and a bridging pattern such that said bridging pattern extends on said first substrate to another gate electrode pattern;

anode-oxidizing, after said step of patterning said metal layer, said conductor pattern to form a second, porous anodic oxide film on each of said edges of said conductor pattern;

anode-oxidizing, after said step of forming said second anodic oxide film, said conductor pattern to form a third, barrier-type anodic oxide film in each of said edges, such that said third anodic oxide film is located inside said second anodic oxide film;

removing, after said step of forming said third anodic oxide film, said second anodic oxide film by an etching process;

removing, after said step of removing said second anodic oxide film, said bridging pattern by an etching process such that said gate electrode pattern is isolated from said another gate electrode pattern;

wherein said step of etching said second anodic oxide film is conducted by a phosphoric acid etchant containing therein a chromium oxide with a concentration level of about 0.03 wt % or more.

Another object of the present invention is to provide a fabrication process of a liquid crystal display device, said liquid crystal display device including: a first substrate; a second substrate facing said first substrate with a separation therefrom by a gap; a conductor pattern formed on said first substrate; and a liquid crystal layer confined in said gap, said method comprising the steps of:

anode-oxidizing said conductor pattern to form a first, porous anodic oxide film on said conductor pattern;

anode-oxidizing, after said step of forming said first anodic oxide film, said conductor pattern to form a second, barrier-type anodic oxide film inside said first anodic oxide film; and removing said first anodic oxide film selectively with respect to said second anodic oxide film, by conducting a wet etching process;

said wet etching process being conducted by a phosphoric acid etchant containing a chromium oxide with a concentration level of 0.03 wt % or more.

According to the present invention, the etching rate for etching an Al metal layer by a wet etching process is reduced substantially as compared with the case of wet etching an anodic oxide film, by merely adding a Cr oxide to the phosphoric acid etchant that used conventionally for etching an anodic oxide film or an Al metal layer by a concentration level of 0.03 wt % or more. Thereby, existence of a pin hole in the anodic oxide film of the barrier type does not cause a defect in the gate electrode pattern.

Other objects and further features of the present invention will become apparent from the following detailed description when read in conjunction with the attache drawings.

BRIEF DESCRIPTION OF THE DRAWINGS

FIGS. 10A, 10B, 10C, 10D, and 10E are fabrication process of a liquid crystal display device according to a first embodiment of the present invention;

DETAILED DESCRIPTION OF THE PREFERRED EMBODIMENT

[First Embodiment]

Figure 2:
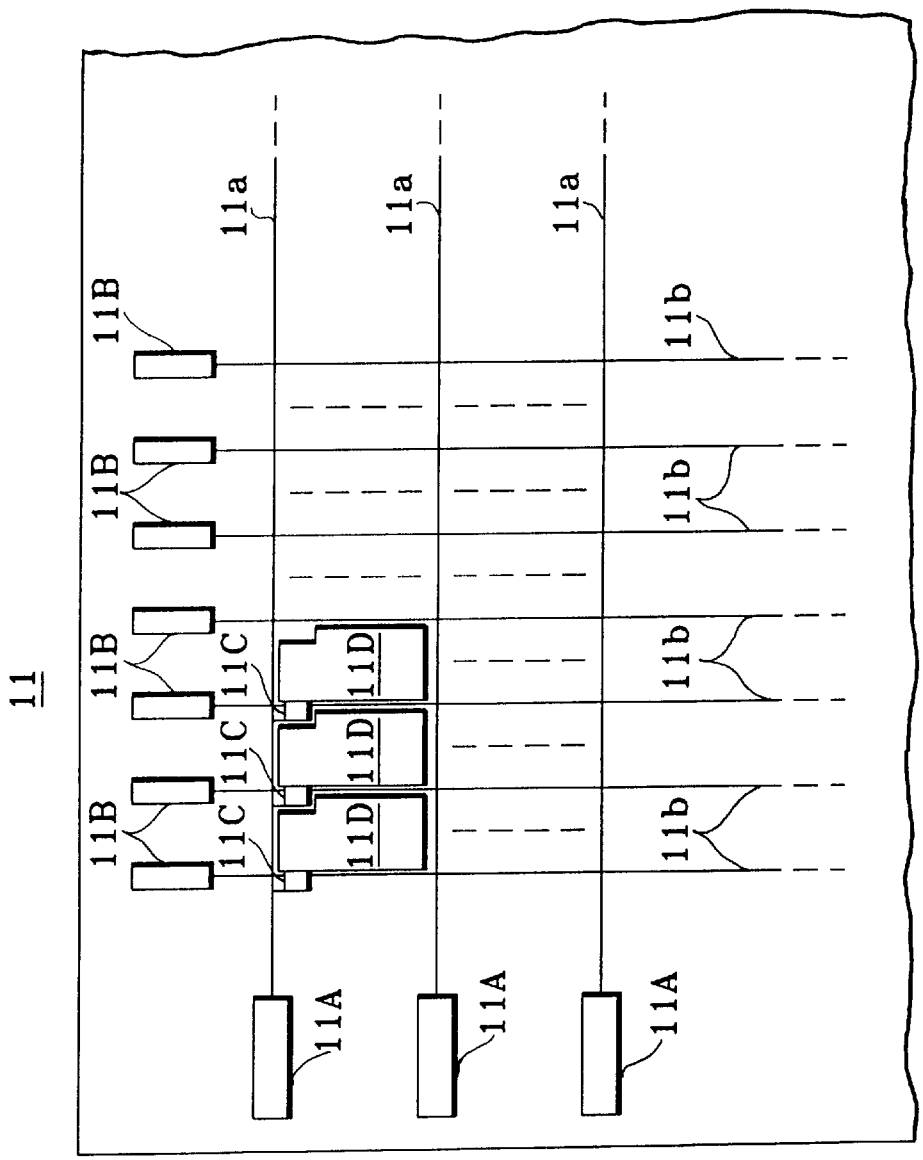
FIG. 2 is a diagram showing a part of the liquid crystal display device of FIG. 1 in an enlarged scale.
Figure 3:
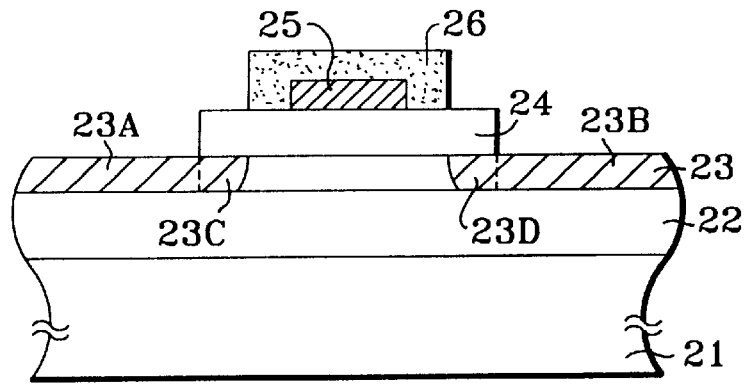
FIG. 3 is a diagram showing the construction of a thin-film transistor having an LDD structure used in the liquid crystal display device of FIG. 1.

FIGS. 10A–10E are diagrams showing the fabrication process of a liquid crystal display device according to a first embodiment of the present invention. In each of the drawings, it should be noted that the left part represents a TFT part corresponding to the TFT 11C of FIG. 2 formed on the glass substrate 11, while the right part of the drawing represents a part corresponding to the conductor pattern 25D of FIG. 5.

Figure 1:
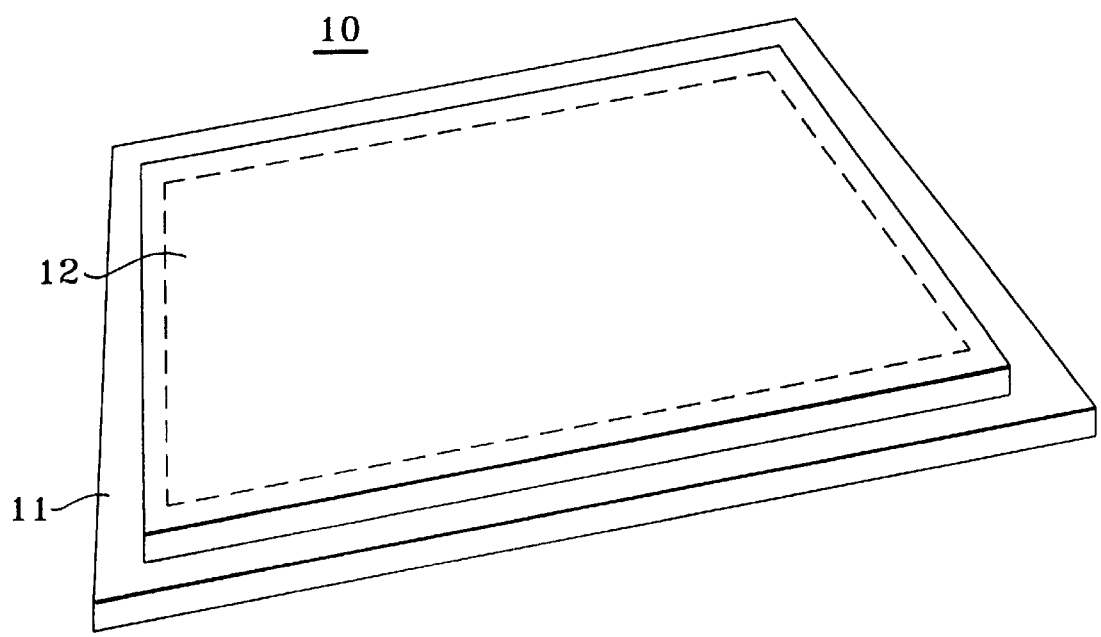
FIG. 1 is a diagram showing a conventional liquid crystal display device in a perspective view.

Referring to the left drawing of FIG. 10A, the TFT 11C is constructed on a glass substrate 41 corresponding to the glass substrate 11 of FIG. 1 and includes an $SiO_2$ film 42 formed on the glass substrate 41 with a thickness of about 200 nm and an active region 43 of a p-type polysilicon pattern formed on the $SiO_2$ film 42 with a thickness of about 45 nm. Similarly to the active region 23, the active region 43 is formed first in the form of an amorphous phase, followed by a crystallization process conducted by a laser beam annealing process at about 200° C. The active region 43 is then patterned by an RIE process that uses $CF_4$ and $O_2$ as an etching gas.

Figure 4A:
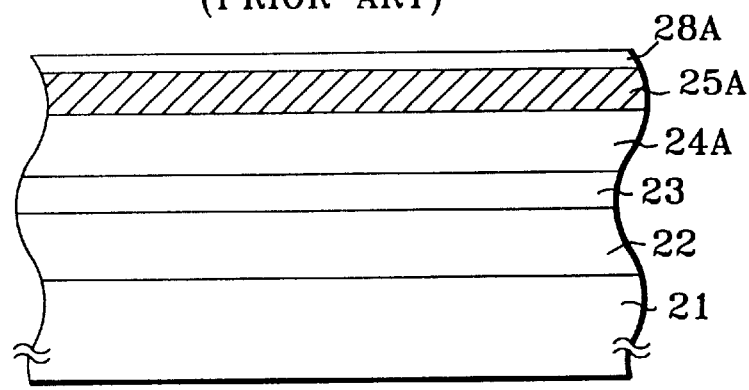
FIGS. 4A, 4B, 4C, 4D, 4E, and 4F are diagrams showing a conventional fabrication process of a thin-film transistor.
Figure 4B:
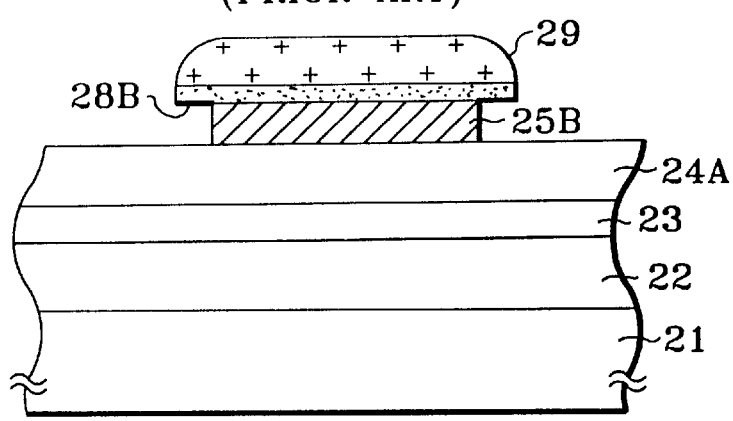
Figure 4C:
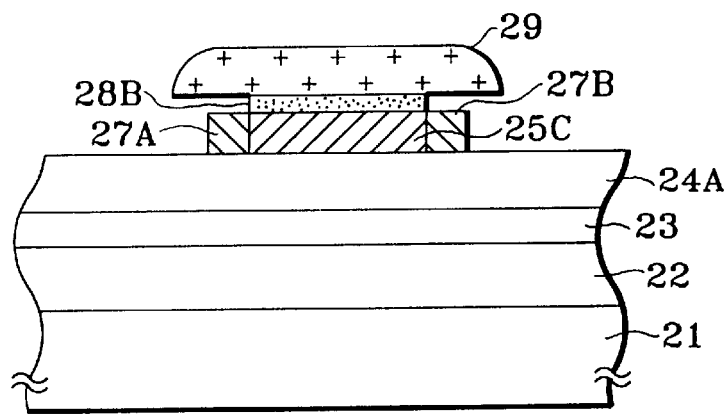
Figure 4D:
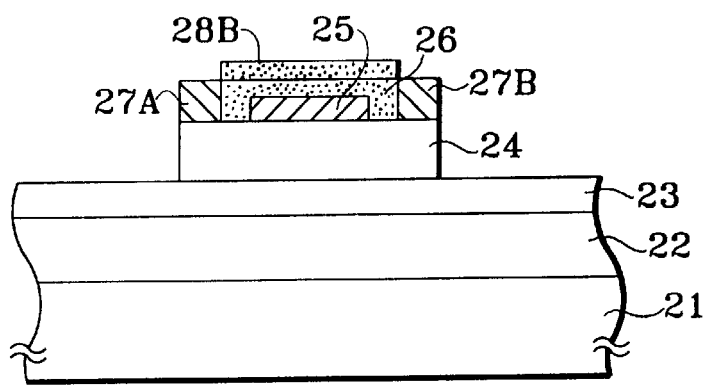

Further, an $SiO_2$ film 44 is formed on the active region 43 in correspondence to the gate insulation film 24 with a thickness of about 120 nm by a CVD process that uses TEOS for the gaseous source material, and a metal layer 45 of Al is formed on the $SiO_2$ film 44 with a thickness of about 300 nm. The gate electrode 45 is covered by a dense anodized $Al_2O_3$ film 46 of the barrier-type with a thickness of about 20 nm in correspondence to the barrier-type anodic oxide film 28A of FIG. 4A.

The Al layer 45 and the underlying $SiO_2$ film 44 thus formed are then patterned into a lattice-shaped pattern similar to the one described with reference to FIG. 5 by using a resist mask, wherein the Al layer 45 thus patterned forms a gate electrode pattern in the TFT region 11C. Thereby, it should be noted that porous anodic oxide films 47A and 47B are formed at respective lateral edges of the gate electrode pattern 45 in correspondence to the porous anodic oxide films 27A and 27B. Further, it should be noted that a pair of barrier-type anodic oxide films are formed at the respective inner sides of the porous anodic oxide films 47A and 47B in continuation with the barrier-type anodic oxide film 46 so as to cover the side walls of the gate electrode pattern 45 of Al.

In the region of the conductor pattern 25D shown at the right side of FIG. 10A, it should be noted that the $SiO_2$ film 42 covers the substrate 41 similarly to the TFT region 11C, and the $SiO_2$ film 44 is deposited on the $SiO_2$ film 42. It should be noted that the polysilicon layer corresponding to the active region 43 at the left part of FIG. 10A is removed already in the step of patterning of the active region 43, and the $SiO_2$ film 44 covers the $SiO_2$ film 42 directly. Further, the foregoing metal layer 45 of Al is formed on the $SiO_2$ film 44, wherein the Al layer 45 is covered by the barrier-type anodic oxide film 46.

Figure 5:
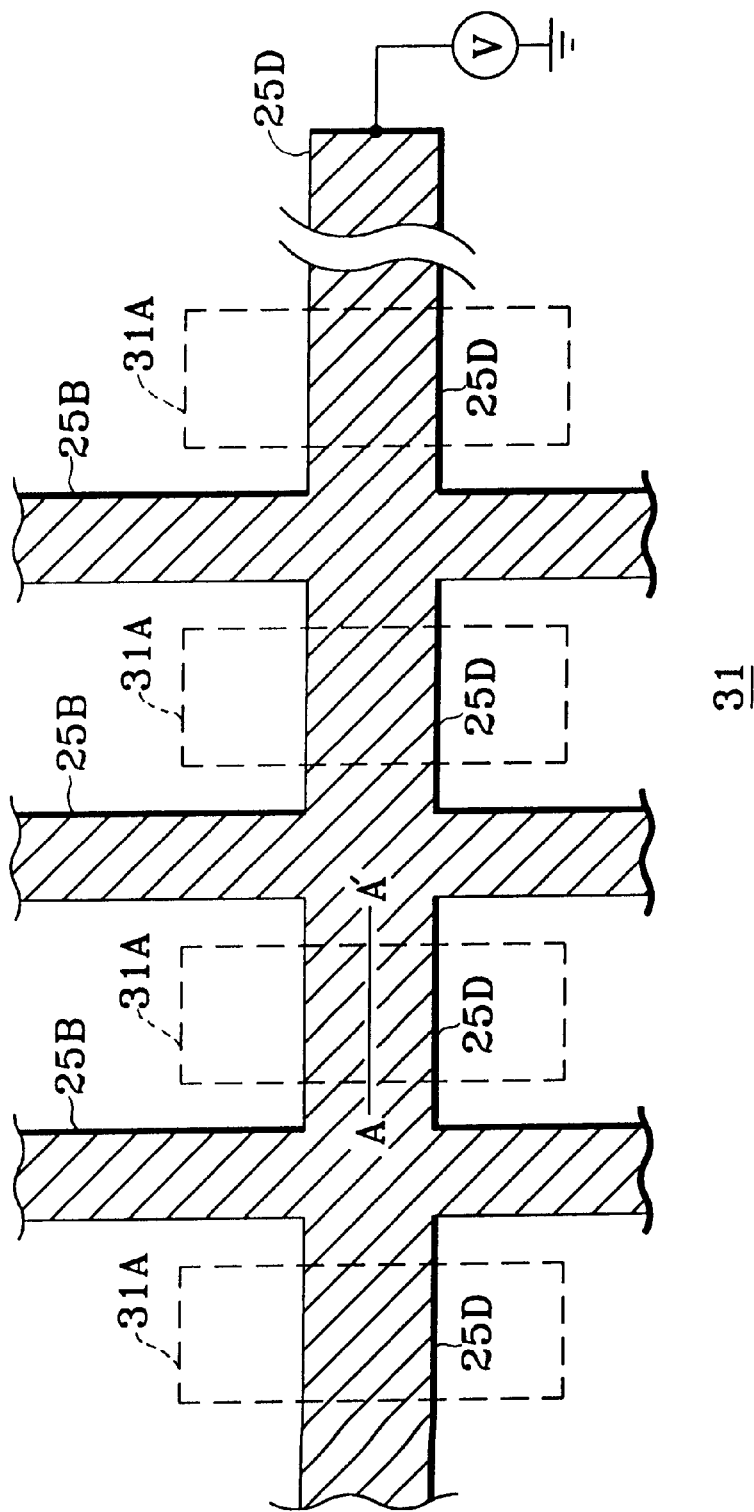
FIG. 5 is a diagram showing an anodic oxidation process used conventionally in a fabrication process of a thin-film transistor.
Figure 6:
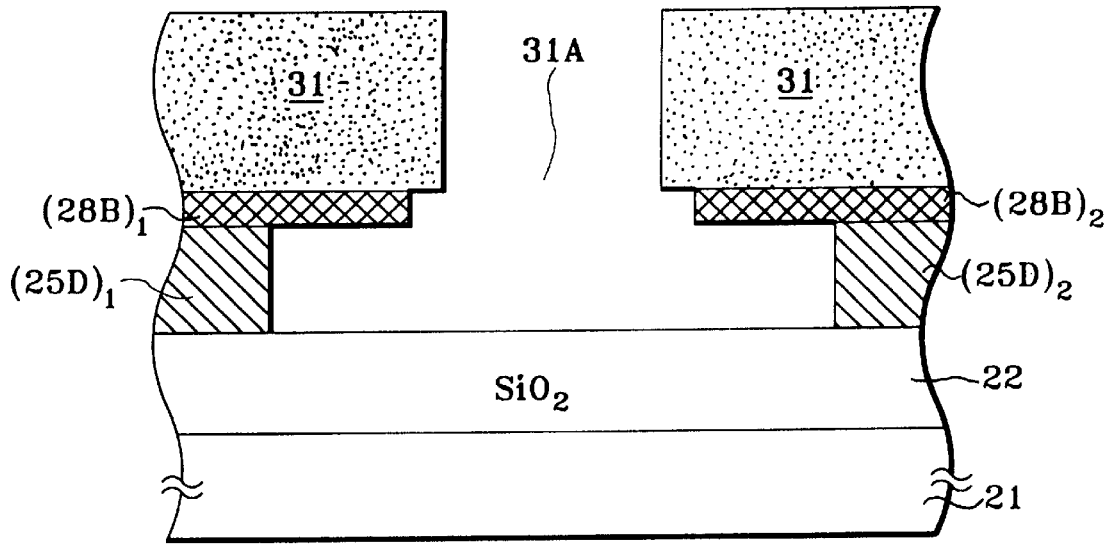
FIG. 6 is a diagram showing the process of dividing a conductor pattern conducted after the process of FIG. 5.
Figure 7:
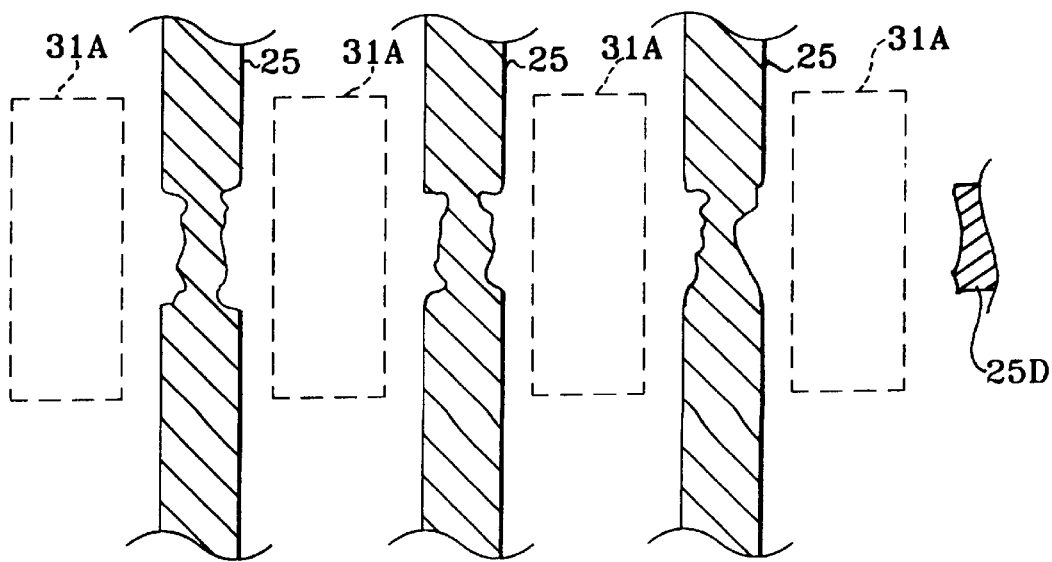
FIG. 7 is a diagram explaining a problem pertinent to the conventional fabrication process of a liquid crystal display device.

Next, in the step of FIG. 10B, the structure of FIG. 10A is covered by a resist pattern 48 corresponding to the resist pattern 31 of FIG. 5, wherein the resist pattern 48 includes a resist window 48A in correspondence to the conductor pattern region 25D, wherein the window 48A corresponds to the window 31A of the resist pattern 31. Further, the barrier-type anodic oxide film 46 thus exposed by the resist window 48A is subjected to a wet etching process conducted by an etchant of a Cr-mixed-acid, while using the resist pattern 48 as a mask. The Cr-mixed-acid used for this purpose may have a known composition containing $H_3PO_4$ with a concentration of 69–71 wt %, $CH_3COOH$ with a concentration of 8.0–10.0 wt % and $Cr_2O_3$ with a concentration of 1.6–2.0 wt %. The etching is conducted typically at a temperature of 65° C. As a result of the etching, the barrier-type anodic oxide film 46 is divided into a first pattern 46A and a second pattern 46B.

After the foregoing step of etching the barrier-type anodic oxide film 46, the exposed part of the Al layer 45 is removed by a wet etching process conducted by using an Al-mixed-acid of a known composition as an etchant. Typically, the Al-mixed-acid contains $H_3PO_4$, $CH_3COOH$, $HNO_3$ and $H_2O$ with a ratio of 15:3:1:1, and the wet etching is conducted at a temperature of about 45° C. As a result of the wet etching process, the Al layer 45 is divided into a first pattern 45A and a second pattern 45B, wherein the anodic oxide pattern 46A forms an overhang structure on the Al pattern 45A. Similarly, the anodic oxide pattern 46B forms an overhang structure on the Al pattern 45B.

Figure 8A:
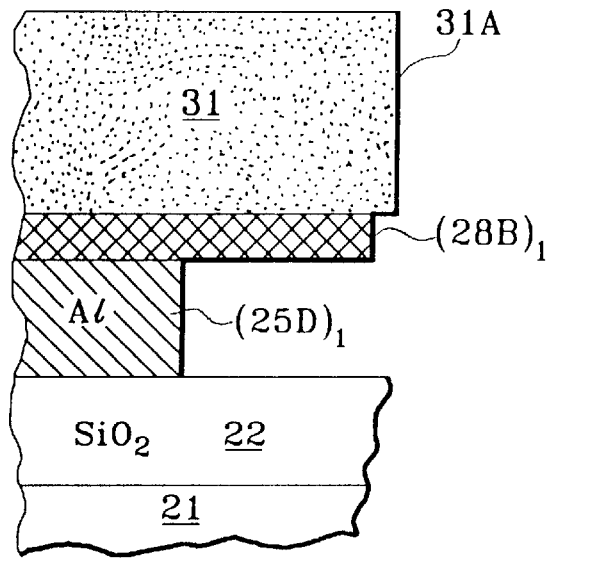
FIGS. 8A and 8B are diagrams explaining the mechanism of the phenomenon of FIG. 7.
Figure 8B:
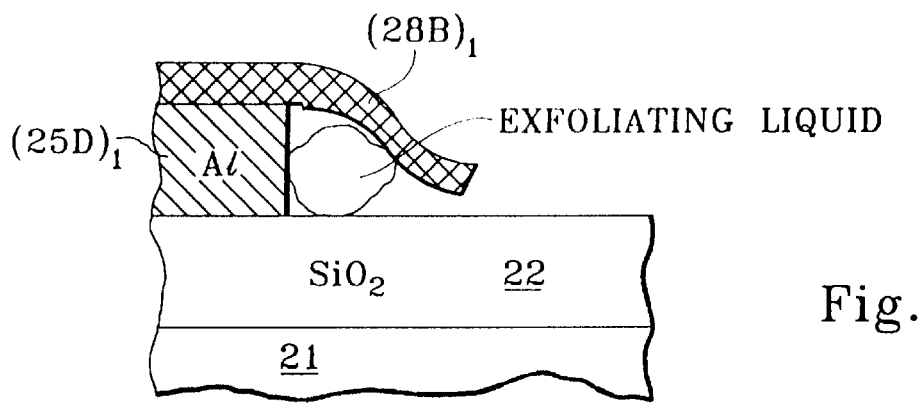
Figure 10C:
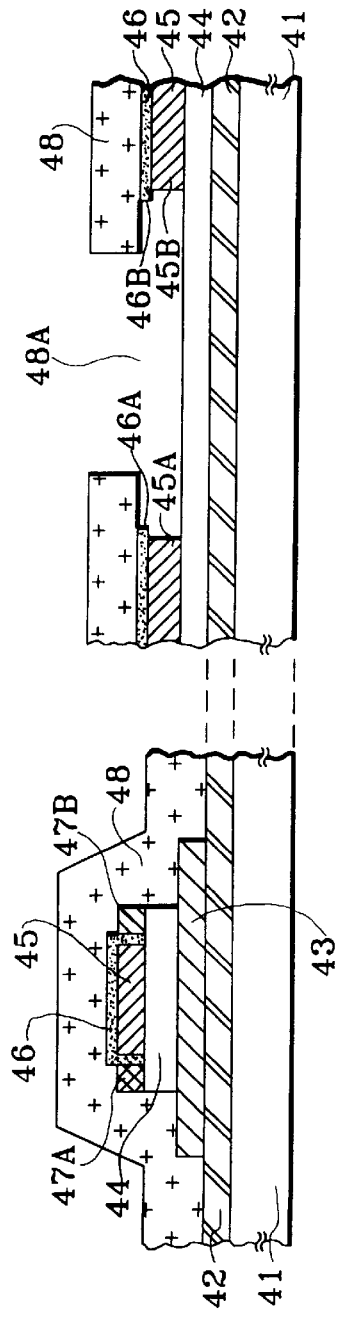

It should be noted that there would occur, when the resist pattern 48 is removed in the state of FIG. 10B, the problem of slackening of the anodic oxide film 46A or 46B and the associated problem of uncontrolled lateral etching of the Al pattern 45A or 45B explained before with reference to FIG. 8B. Thus, in order to avoid the foregoing problem, the present embodiment employs a step of FIG. 10C in which the overhanging anodic oxide patterns 46A and 46B are removed by a wet etching process conducted by using the Cr-mixed-acid. After the step of FIG. 10C, the resist pattern 48 is removed as represented in FIG. 10D.

Figure 9:
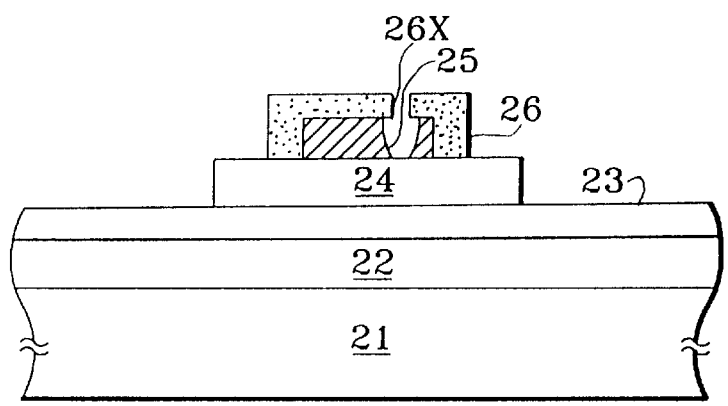
FIG. 9 is a diagram showing another problem pertinent to a conventional fabrication process of a liquid crystal display device.
Figure 10D:
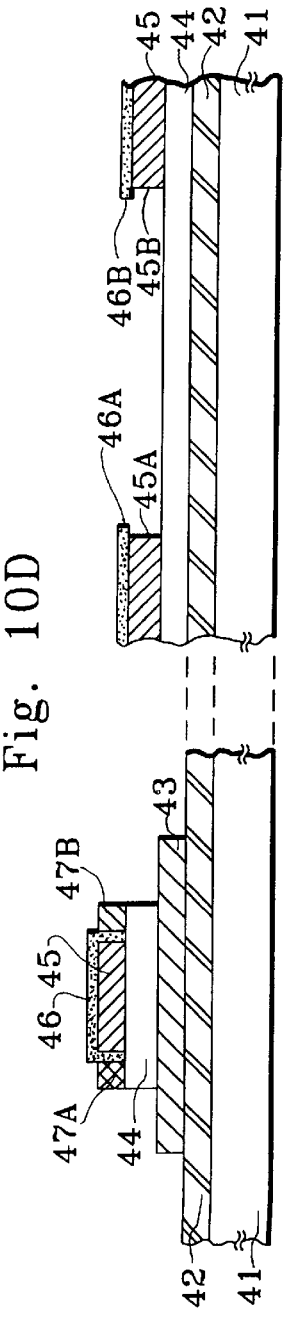
Figure 10E:
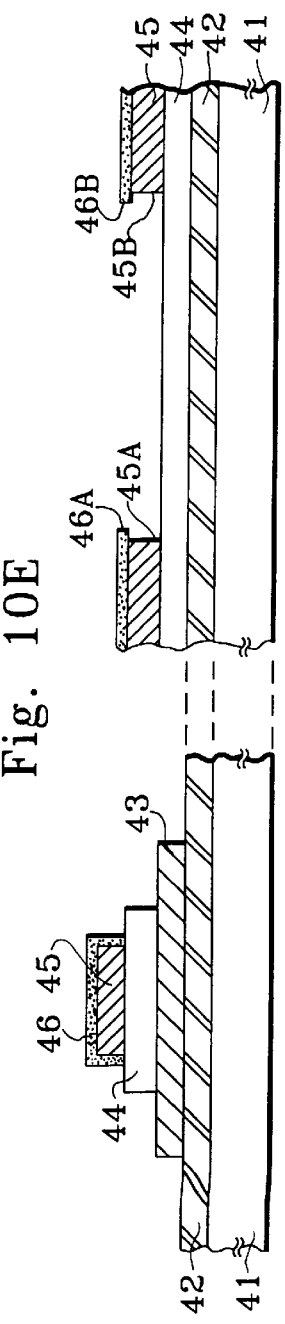

Next, in the step of FIG. 10E, the structure of FIG. 10D is subjected to a wet etching process and the porous anodic oxide films 47A and 47B at the outer sides of the barrier-type anodic oxide film 46 are removed selectively. In the step of FIG. 10E, it should be noted that the conductor pattern 45 corresponding to the conductor pattern 25D is already disconnected in the step of FIG. 10C in correspondence to the resist window 48A, and the gate electrode pattern 45 is disconnected from the gate electrode pattern of an adjacent TFT. Thereby, the problem of formation of pinholes in the barrier-type anodic oxide film 46 explained with reference to FIG. 9, is effectively suppressed, and the problem of unwanted etching of the gate electrode pattern 45 by the Al-mixed-acid through such a pinhole is eliminated.

Figure 11:
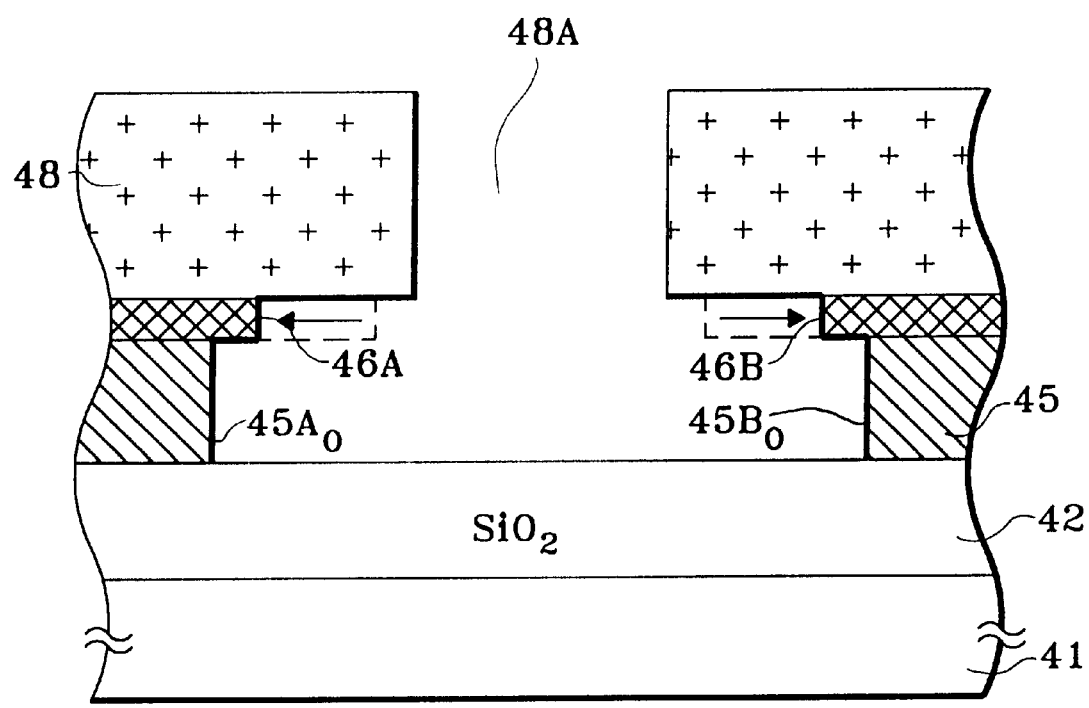
FIG. 11 is a diagram showing the process of FIG. 10C in detail.

FIG. 11 shows the process of FIG. 10C in detail.

Referring to FIG. 11, the barrier-type anodic oxide patterns 46A and 46B undergo a recession in the direction indicated by arrows as a result of the wet etching process conducted by using the Cr-mixed-acid after the step of wet etching of the Al layer 45, wherein it should be noted that such a treatment by the Cr-mixed-acid induces a formation of-oxide layers 45Ao and 45Bo on the respective edge surfaces of the Al patterns 45A and 45B. The oxide layers 45Ao and 45Bo thus formed prevent the lateral etching of the Al patterns 45A or 45B.

Figure 4E:
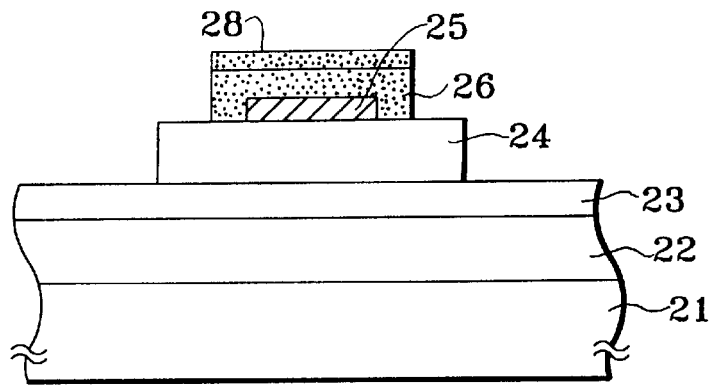
Figure 4F:
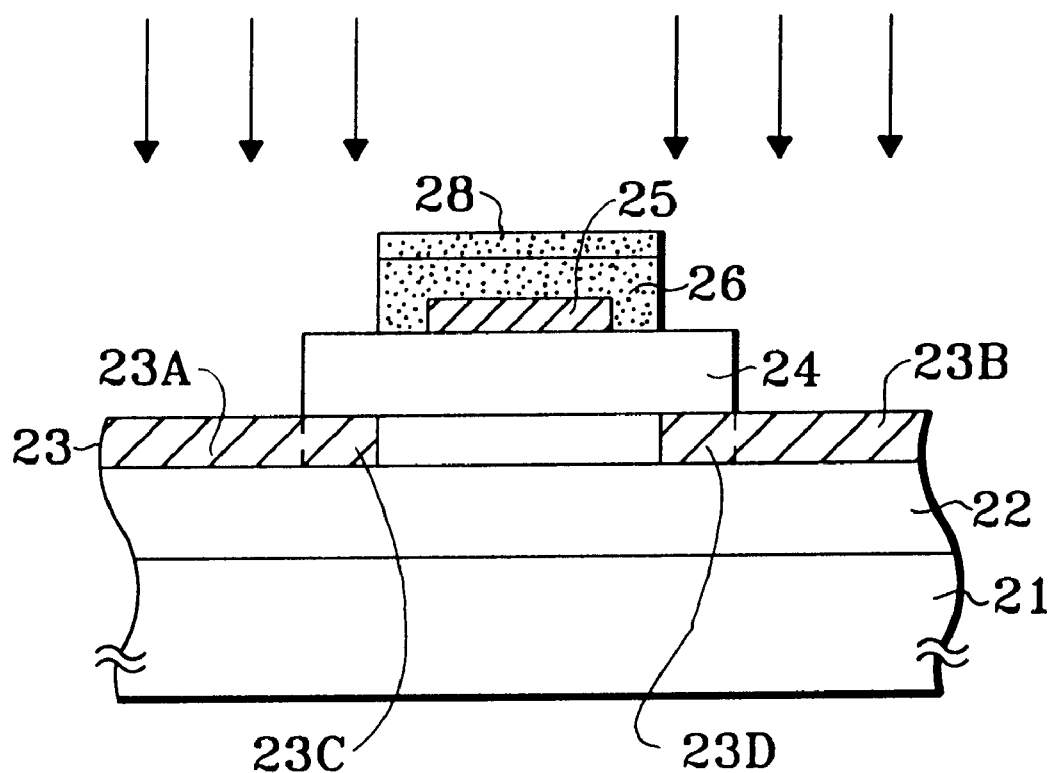

After the step of FIG. 10C, an ion implantation process and an activation process are conducted similarly to the case of FIG. 4F, and the desired LDD structure is formed in the TFT. As this process is already explained with reference to FIG. 4F, further description thereof will be omitted.

[Second Embodiment]

Meanwhile, the inventor of the present invention has conducted a series of experiments in search of an etchant suitable for use in the conventional step of FIG. 4E for removing the porous anodic oxide film selectively with respect to a metal layer of Al or an Al alloy.

Figure 12A:
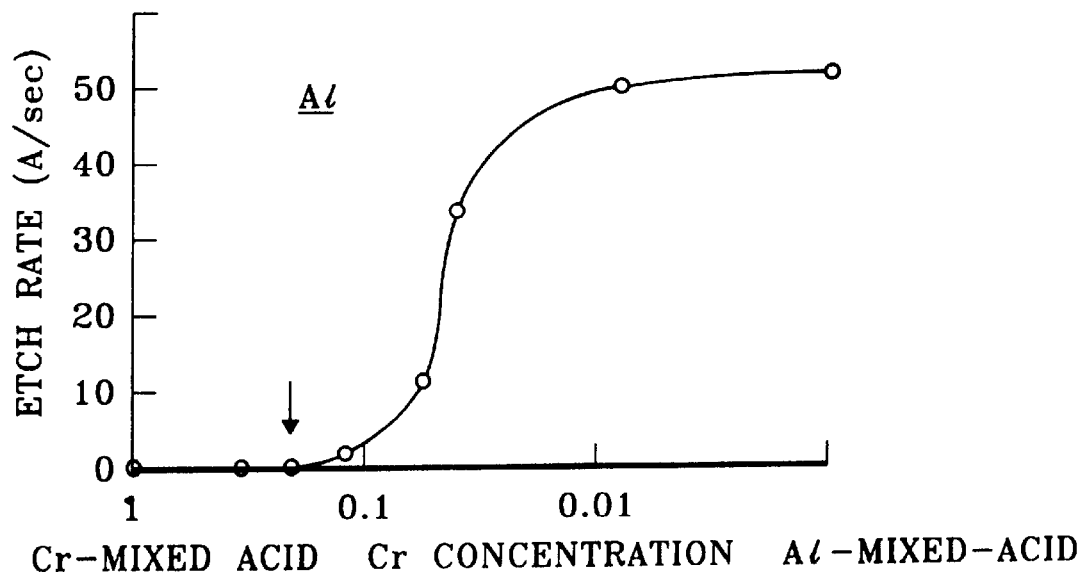
FIGS. 12A and 12B are diagrams explaining the principle of a second embodiment of the present invention.

FIG. 12A shows the etching rate observed when etching an Al—Sc alloy by an etchant in which an Al-mixed-acid and a Cr-mixed-acid having respective compositions represented in Table 1 are mixed with various proportions, wherein the experiments were conducted on a test piece of an Al—Sc alloy film having a size of 10 cm×10 cm and a thickness of about 300 nm. In the experiments, the wet etching process was conducted at a temperature of 45° C., and the result was evaluated by measuring the thickness of the test piece film.

TABLE 1

| Al-mixed-acid | $H_3PO_4$ | $CH_3COOH$ | $HNO_3$ | $H_2O$ |
|---|---|---|---|---|
| | 15 | 3 | 1 | 1 |
| Cr-mixed-acid | $CrO_3$ | $H_2O$ | Al-mixed-acid | |
| | 300 g | 250 g | 10 1 | |

Referring to FIG. 12A, the etching rate of the Al alloy film is substantially zero when the Cr-mixed-acid of Table 1 is used for the etchant. In this case, no substantial etching occurs in the Al alloy film. When the concentration of the Cr-mixed-acid is decreased below about 0.1 vol %, on the other hand, it can be seen that the etching rate of the Al alloy film increases sharply and reaches a saturation value of about 52 Å/seconds when the concentration level is decreased below about 0.01 vol %. In the composition represented in FIG. 12A by an arrow, in which this change of the etching rate occurs, the etchant contains $CrO_3$ with a concentration level of about 0.03 wt %. When the concentration of $CrO_3$ exceeds the foregoing value, the etching rate of the Al alloy film drops sharply.

Figure 12B:
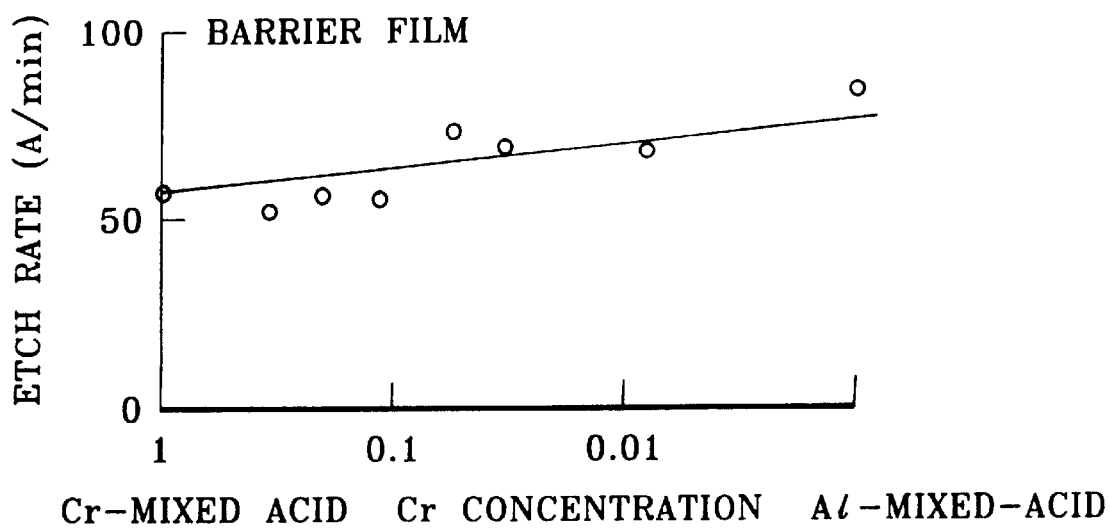

FIG. 12B, on the other hand, represents the case of etching a barrier-type anodic oxide film formed on the test piece of the Al—Sc alloy of the foregoing size of 10 cm×10 cm with a thickness of 120 nm, by using a mixture of the Al-mixed-acid and the Cr-mixed-acid of Table 1 as an etchant. In the experiments of FIG. 12B, the wet etching process is conducted at 45° C. It should be noted that the barrier type anodic oxide film is formed by causing an anodic oxidation process in the surface of the Al—Sc alloy film by applying a voltage of 83 V for 35 minutes while supplying a current of 150 mA. The etching rate was evaluated by measuring the thickness of the barrier-type anodic oxide film.

Referring to FIG. 12B, it can be seen that the etching rate of the barrier-type anodic oxide film increases generally linearly at 45° in proportion with the concentration of the Al-mixed-acid and reaches a value of 80 Å/minutes when the Al-mixed-acid alone is used for the etchant. When the Cr-mixed-acid alone is used, on the other hand, an etching rate of about 60 Å/minutes or 1 Å/second is observed. The result of FIG. 12B indicates that the barrier-type anodic oxide film is substantially immune to the wet etching process of the Al-mixed-acid or the Cr-mixed-acid as long as the etching is conducted at 45° C.

FIGS. 13A–13F represents the result of the experiments in which a porous anodic oxide film on the test piece is subjected to an wet etching process. In the experiments, the porous anodic oxide film is formed on the barrier-type anodic oxide film covering the Al—Sc alloy test piece by conducting the anodic oxidation process for 40 minutes under a voltage of 4V while supplying a current of 10 mA. It should be noted that FIGS. 13A–13F represents the surface structure of the test piece observed by a scanning electron microscope. Direct determination of the film thickness, and hence direct measurement of the etching rate, is difficult in the case of the porous anodic oxide film.

Figure 13A:
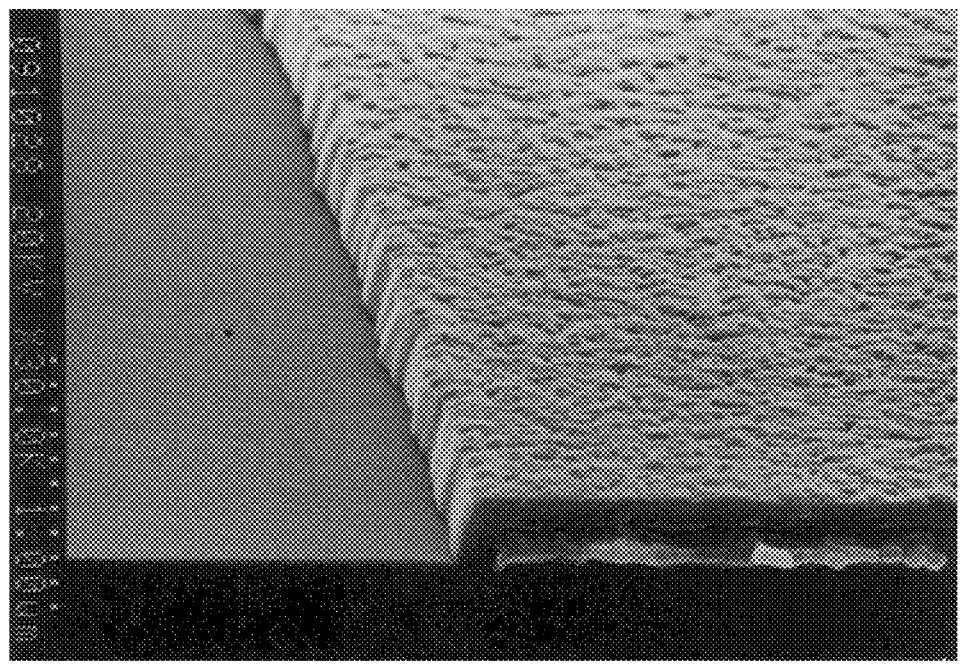
FIGS. 13A, 13B, 13C, 13D, 13E, and 13F are further diagrams explaining the principle of the second embodiment.
Figure 13B:
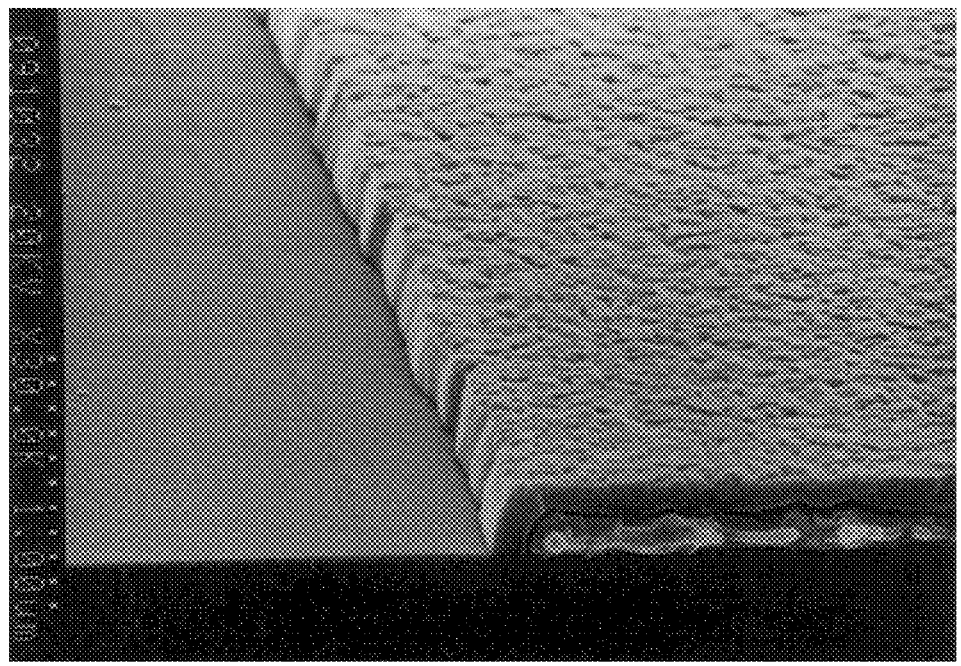
Figure 13C:
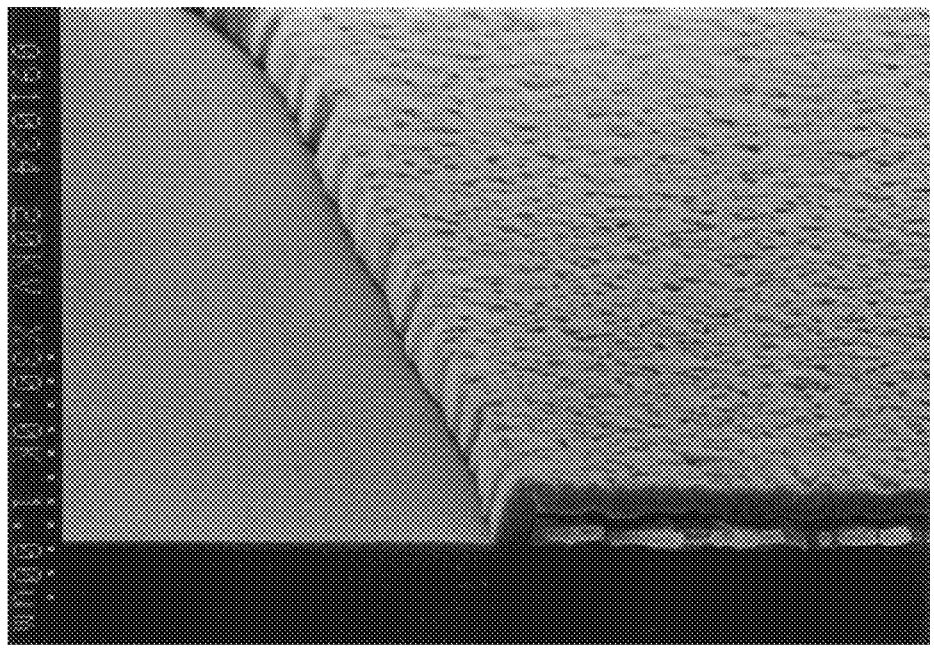
Figure 13D:
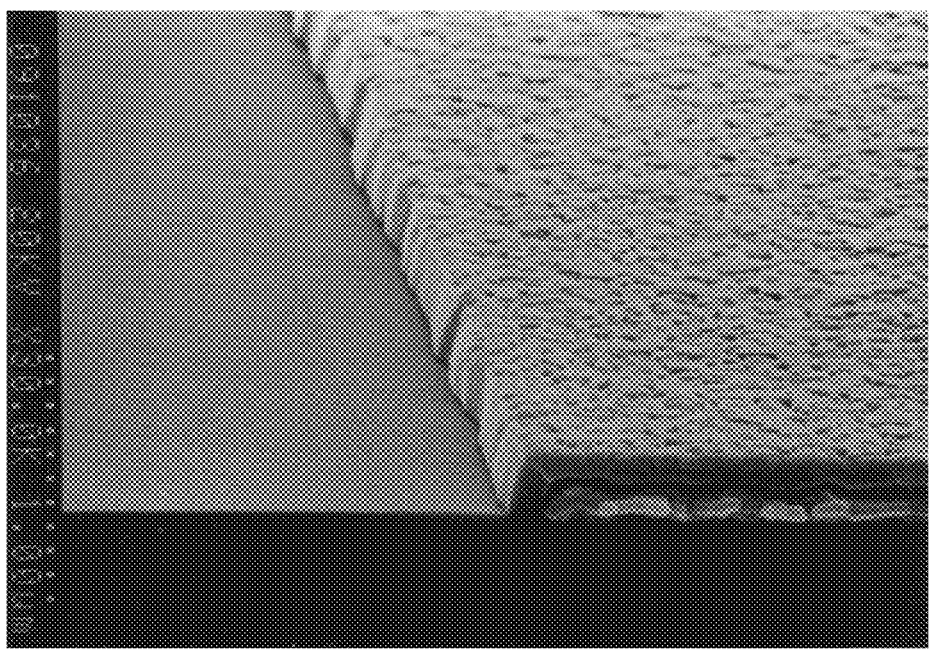
Figure 13E:
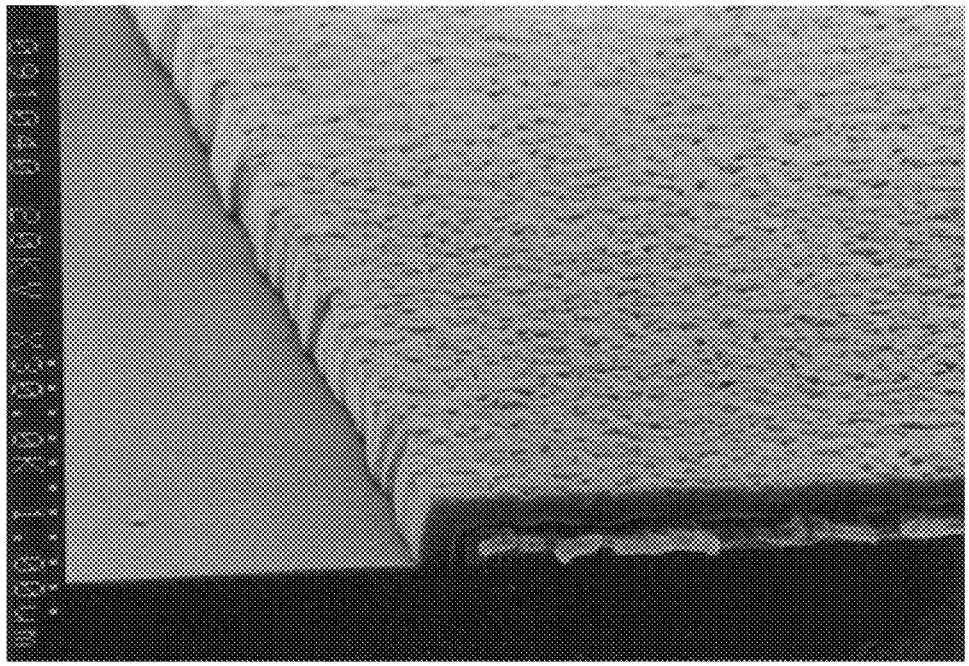
Figure 13F:
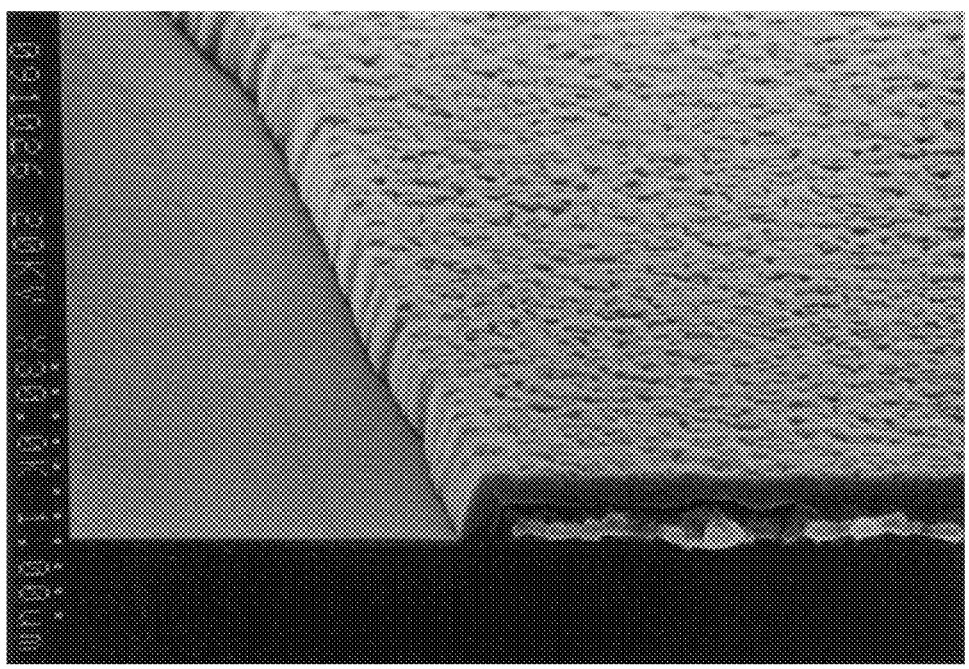

Referring to the drawings, it should be noted that FIG. 13A represents the result for the case in which the Cr-mixed-acid of Table 1 is used for the etchant, while FIG. 13B represents the result for the case in which the etchant contains the Cr-mixed-acid with a ratio of ⅕ in volume. Further, FIG. 13C represents the result for the case in which the etchant contains the Cr-mixed-acid with a ratio of ⅑ in volume, FIG. 13D represents the case in which the etchant contains the Cr-mixed-acid with a ratio of 1/18, FIG. 13E represents the case in which the etchant contains the Cr-mixed-acid with a ratio of 1/25, and FIG. 13F represents the case in which the Al-mixed-acid is used for the etchant.

In any of the cases, it can be seen that the porous anodic oxide film is removed substantially completely, while the barrier-type anodic oxide film remains substantially intact. In FIGS. 13A–13F, it should be noted that the pattern remaining at the right side of the drawing represents the barrier-type anodic oxide film that is resistant against the wet etching process. In the close look of the cross-sectional view of the barrier-type anodic oxide film, it can be seen that the anodic oxide film covers the Al—Sc test piece represented as a bright pattern in each of FIGS. 13A–13F. As noted previously, direct measurement of the etching rate is difficult for the porous anodic oxide film.

Figure 14:
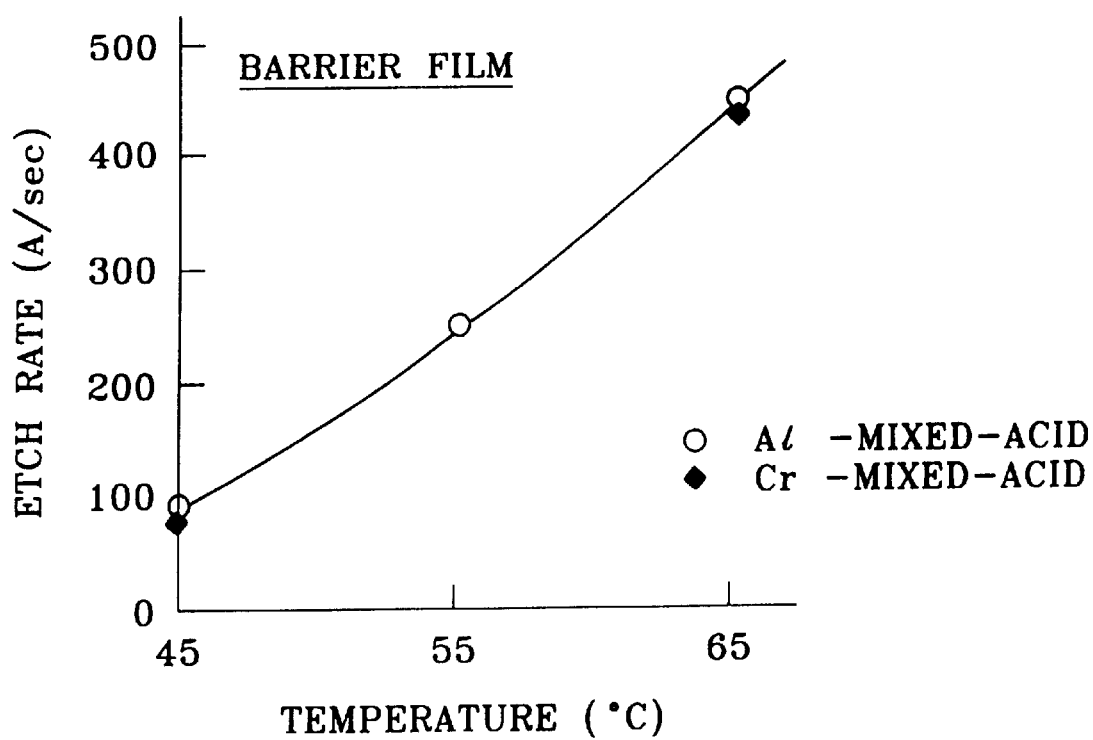
FIG. 14 is a further diagram explaining the principle of the second embodiment.

FIG. 14 shows the relationship between the etching rate and the temperature for the case of etching the barrier-type anodic oxide film by using the Cr-mixed-acid and the Al-mixed-acid of Table 1.

Referring to FIG. 14, it can be seen that the barrier-type anodic oxide film can be etched with an etching rate of 400 Å/min or more by setting the temperature to about 65° C., as is practiced conventionally. When the temperature of the wet etching process is reduced to about 45° C., on the other hand, the etching rate of the barrier-type anodic oxide film is reduced to less than about 100 Å/min, irrespective of whether the Al-mixed-acid of Table 1 is used or the Cr-mixed-acid of Table 1 is used. In terms of the etching rate per second, the foregoing etching rate is about 1.7 Å/second. In other words, the barrier-type anodic oxide film is substantially immune to the wet etching process as long as the etching is conducted at about 45° C.

Figure 15A:
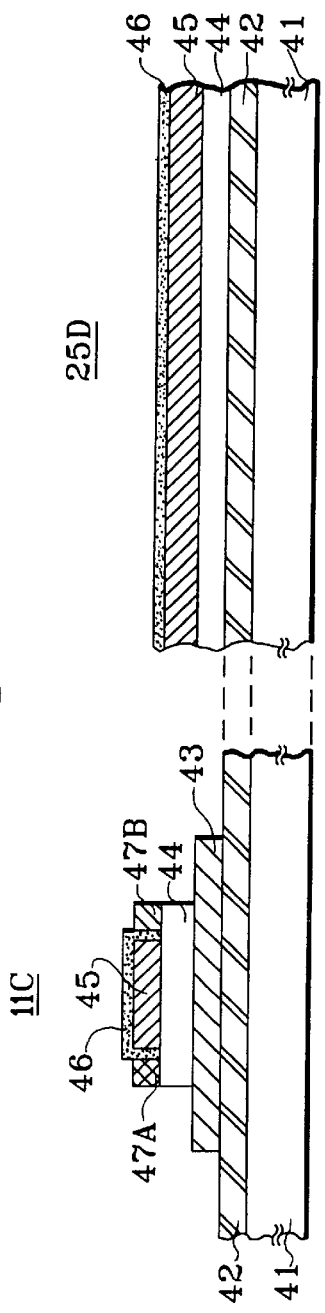
FIGS. 15A, 15B, and 15C are diagrams showing the fabrication process of a liquid crystal display device according to the second embodiment.
Figure 15B:
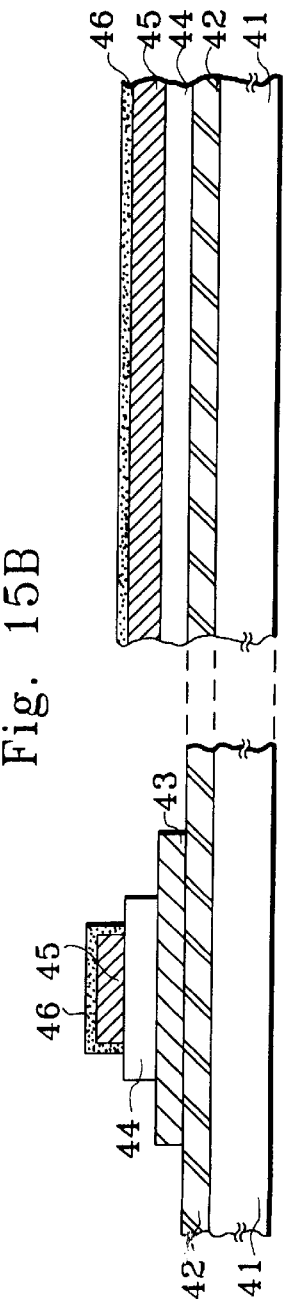
Figure 15C:
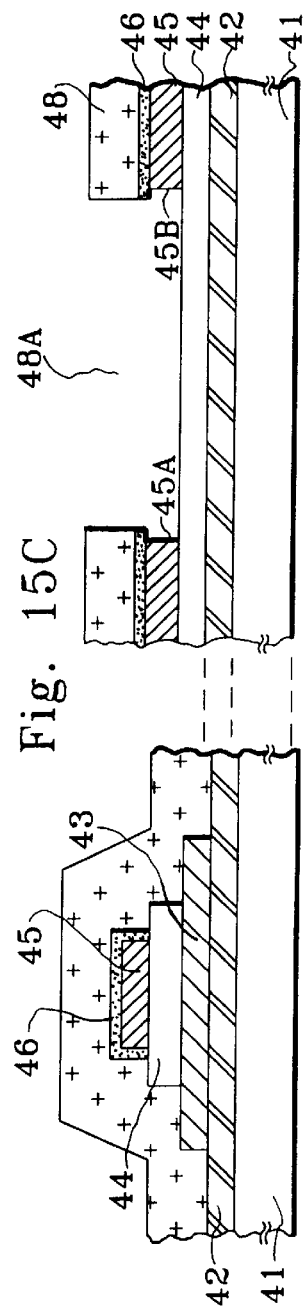

FIGS. 15A–15C are diagrams showing the fabrication process of a liquid crystal display device according to a second embodiment, wherein those parts corresponding to the parts described previously are designated by the same reference numerals and the description thereof will be omitted.

Referring to FIG. 15A, the process of this step is substantially identical with the step of FIG. 10A and the gate electrode 45 is covered by the barrier-type anode oxide film 46 in correspondence to the TFT region 11C. Further, respective lateral edges of the gate electrode 45 carry porous anodic oxide films 47A and 47B.

Next, in the step of FIG. 15B, the porous anodic oxide films 47A and 47B are removed selectively by a wet etching process conducted at a temperature of typically 45–50° C. while using a Cr-mixed-acid containing $CrO_3$ with a concentration level of 0.03 wt % or more, for the etchant. As explained previously, the barrier-type anodic oxide film 46 and the underlying gate electrode pattern 45 of Al are substantially immune to the etching process, and the risk that the gate electrode pattern 45 is unwantedly etched or disconnected at the time of the etching process of the porous anodic oxide films 47A and 47B, is eliminated even when a pin hole such as the pinhole 26X of FIG. 9 is formed in the barrier-type anodic oxide film 46 as a result of an electrochemical reaction. In the present embodiment, the process of FIG. 15B is conducted in the state that the conductor pattern 25D remains on the substrate 41 continuously.

Next, in the step of FIG. 15C, the barrier-type anodic oxide film 46 and the underlying Al layer 45 are patterned consecutively, first by the wet etching process conducted at 65° C. by using the Cr-mixed-acid, and second by the wet etching process conducted by using the Al-mixed-acid. During the first and second wet etching processes, the resist pattern 48 is used as a mask. It should be noted that the resist pattern includes the window 48A exposing a part of the conductor pattern 25D. The Cr-mixed-acid used in this step may be the one having a conventional, known composition or the one having the composition of Table 1.

By applying the steps of FIGS. 4E and 4F to the structure of FIG. 15C, the TFT 11C having the desired LDD structure is obtained. As this process is already explained before, further description thereof will be omitted.

Figure 16:
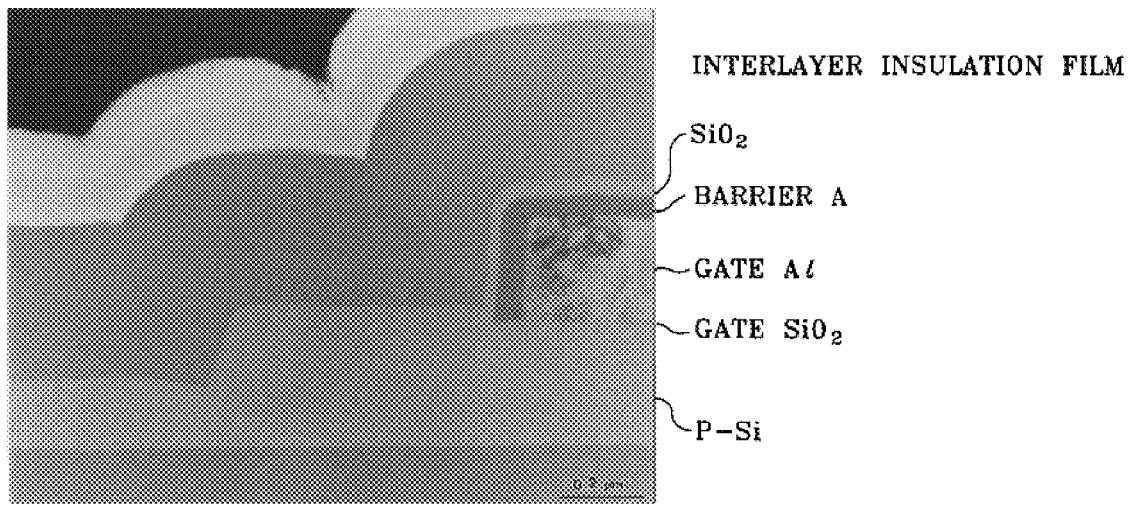
FIG. 16 is a diagram showing a part of the liquid crystal display device fabricated according to the second embodiment of the present invention.

FIG. 16 shows the TEM photograph of the TFT thus obtained.

Referring to FIG. 16, the part designated by "gate Al" corresponds to the gate electrode pattern 45 of FIG. 15B or 15C and is formed on the gate insulation film 44 represented by "gate $SiO_2$ film." Further, the electrode pattern 45 is covered by a layer designated by "barrier AO" corresponding to the barrier-type anodic oxide film 46.

It should be noted that the gate insulation film 44 designated as "gate SiO$_2$ film" is formed on a polysilicon film corresponding to the polysilicon pattern 43 and designated as "P—Si," while the gate electrode pattern 45 thus covered by the barrier-type anodic oxide film 46 or "barrier AO" is covered by an SiO$_2$ film and an interlayer insulation film not illustrated in 17A and 17B.

As will be apparent from FIG. 16, the barrier-type anodic oxide film 46 is free from pinholes, indicating that erosion or disconnection does not occur in the gate electrode pattern 45 at the time of the wet etching process of the porous anodic oxide films 47A and 47B, even when the wet etching process is conducted in the state that the gate electrode pattern 45 is connected to the gate electrode pattern of another TFT via the conductor pattern 25D.

Further, the present invention is not limited to the embodiments described heretofore, but various variations and modifications may be made without departing from the scope of the invention.

The present application is based on Japanese priority application No.10-192012 filed on Jul. 7, 1998, the entire contents of which are hereby incorporated by reference.

What is claimed is:

1. A method of fabricating a liquid crystal display device, said liquid crystal display device including: a first substrate; a second substrate facing said first substrate with a separation therefrom by a gap; a thin-film transistor formed on said first substrate; and a liquid crystal layer confined in said gap, said method comprising the steps of:

forming a semiconductor layer on said first substrate;
   forming an insulation film on said semiconductor layer;
   forming a metal layer on said insulation film;
   anode-oxidizing a surface of said metal layer, to form a first anodic oxide film of a barrier-type on said surface;
   patterning, after said step of forming said first anodic oxide film, said metal layer to form a conductor pattern defined by a pair of edges such that said conductor pattern includes a gate electrode pattern and a bridging pattern, said bridging pattern extending on said first substrate from said gate electrode pattern to another gate electrode pattern;
   anode-oxidizing, after said step of patterning said metal layer, said conductor pattern to form a second, porous anodic oxide film on each of said edges of said conductor pattern;
   anode-oxidizing, after said step of forming said second anodic oxide film, said conductor pattern to form a third, barrier-type anodic oxide film in each of said edges, such that said third anodic oxide film is located inside said second anodic oxide film;
   removing, after said step of forming said third anodic oxide film, said bridging pattern by an etching process such that said gate electrode pattern is isolated from said another gate electrode pattern; and
   removing, after said step of removing said bridging pattern, said second anodic oxide film by an etching process.

2. A method as claimed in claim 1, wherein said etching process used in said step of isolating said gate electrode pattern includes the steps of: removing said first anodic oxide film covering said bridging pattern by a first etchant; and removing said bridging pattern by a second etchant, said method further including, after said step of removing said bridging pattern, removing said first anodic oxide film formed adjacent to said bridging pattern and forming an overhang structure after said bridging pattern being removed, by using said first etchant.

3. A method as claimed in claim 2, wherein said etching process used in said step of isolating said gate electrode pattern is conducted by using a resist pattern covering said thin-film transistor and having a window in corresponding to said bridging pattern, said resist pattern being removed after said step of removing said first anodic oxide film forming said overhang structure.

4. A method as claimed in claim 2, wherein said step of etching said second anodic oxide film is conducted by using said second etchant.

5. A method as claimed in claim 2, wherein said first etchant contains a phosphoric acid and a chromium oxide, said second etchant contains a phosphoric acid.

6. A method as claimed in claim 1, wherein said conductor pattern contains Al as a primary component.

7. A method of fabricating a liquid crystal display device including a first substrate, a second substrate facing said first substrate with a separation therefrom by a gap, a thin film transistor formed on said first substrate, and a liquid crystal layer confined in said gap, said method comprising the steps of:

forming a semiconductor layer on said first substrate;
   forming an insulation film on said semiconductor layer;
   forming a metal layer on said insulation film;
   anode-oxidizing a surface of said metal layer to form a first, barrier-type anode oxide film on said surface;
   patterning, after said step of forming said first anodic oxide film, said metal layer to form a conductor pattern defined by a pair of edges and including a gate electrode pattern and a bridging pattern such that said bridging pattern extends on said first substrate to another gate electrode pattern;
   anode-oxidizing, after said step of patterning said metal layer, said conductor pattern to form a second, porous anodic oxide film on each of said edges of said conductor pattern;
   anode-oxidizing, after said step of forming said second anodic oxide film, said conductor pattern to form a third, barrier-type anodic oxide film in each of said edges, such that said third anodic oxide film is located inside said second anodic oxide film;
   removing, after said step of forming said third anodic oxide film, said second anodic oxide film by an etching process;
   removing, after said step of removing said second anodic oxide film, said bridging pattern by an etching process such that said gate electrode pattern is isolated from said another gate electrode pattern;
   wherein said step of etching said second anodic oxide film is conducted by a phosphoric acid etchant containing therein a chromium oxide with a concentration level of about 0.03 wt % or more.

8. A method as claimed in claim 7, wherein said step of etching said second anodic oxide film is conducted at a temperature of about 60° or lower.

9. A method as claimed in claim 7, wherein said etchant contains, in addition to said phosphoric acid and said chromium oxide, an acetic acid and a nitric acid.

10. A method of fabricating a liquid crystal display device, said liquid crystal display device including: a first substrate; a second substrate facing said first substrate with a separation therefrom by a gap; a conductor pattern formed on said first substrate; and a liquid crystal layer confined in said gap, said method comprising the steps of:

anode-oxidizing said conductor pattern to form an anodic oxide film of a barrier-type on said conductor pattern;

removing a part of said anodic oxide film by conducting a wet etching process;

removing said conductor pattern for a part from which said anodic oxide film is removed by conducting a wet etching process; and removing, after said step of removing said conductor pattern, said anodic oxide film by a wet etching process.

11. A method as claimed in claim 10, wherein said step of wet-etching said barrier layer anodic oxide film is conducted by an etchant of a phosphoric acid added with a chromium oxide.

12. A fabrication process of a liquid crystal display device, said liquid crystal display device including: a first substrate; a second substrate facing said first substrate with a separation therefrom by a gap; a conductor pattern formed on said first substrate; and a liquid crystal layer confined in said gap, said method comprising the steps of:

anode-oxidizing said conductor pattern to form a first, porous anodic oxide film on said conductor pattern;

anode-oxidizing, after said step of forming said first anodic oxide film, said conductor pattern to form a second, barrier-type anodic oxide film inside said first anodic oxide film; and removing said first anodic oxide film selectively with respect to said second anodic oxide film, by conducting a wet etching process;

said wet etching process being conducted by a phosphoric acid etchant containing a chromium oxide with a concentration level of 0.03 wt % or more.

* * * * *

UNITED STATES PATENT AND TRADEMARK OFFICE
CERTIFICATE OF CORRECTION

PATENT NO. : 6,156,662
DATED : December 5, 2000
INVENTOR(S) : Ohori et al.

It is certified that error appears in the above-identified patent and that said Letters Patent is hereby corrected as shown below:

Title page,
Item [75], Inventors, delete "Kawasai" and insert -- Kawasaki --.

Signed and Sealed this

Eleventh Day of December, 2001

Attest:

NICHOLAS P. GODICI
Attesting Officer   Acting Director of the United States Patent and Trademark Office